(12) United States Patent
Jagannathan

(10) Patent No.: US 9,380,314 B2
(45) Date of Patent: Jun. 28, 2016

(54) PIXEL RETRIEVAL FOR FRAME RECONSTRUCTION

(75) Inventor: Shyam Jagannathan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 501 days.

(21) Appl. No.: 12/972,555

(22) Filed: Dec. 20, 2010

(65) Prior Publication Data

US 2012/0155540 A1   Jun. 21, 2012

(51) Int. Cl.
H04N 19/44 (2014.01)
H04N 19/176 (2014.01)
H04N 19/119 (2014.01)
H04N 19/51 (2014.01)
H04N 19/513 (2014.01)
H04N 19/174 (2014.01)

(52) U.S. Cl.
CPC ............. *H04N 19/44* (2014.11); *H04N 19/119* (2014.11); *H04N 19/174* (2014.11); *H04N 19/176* (2014.11); *H04N 19/51* (2014.11); *H04N 19/513* (2014.11)

(58) Field of Classification Search
CPC ... H04N 19/176; H04N 19/119; H04N 19/44; H04N 19/513; H04N 19/174; H04N 19/51; H04N 7/26
USPC ............ 375/240.12, 240.16, 240.01; 386/126
IPC ........................................................ H04N 7/26
See application file for complete search history.

(56) References Cited

U.S. PATENT DOCUMENTS

| | | | |
|---|---|---|---|
| 2003/0174775 A1* | 9/2003 | Nagaya et al. | 375/240.12 |
| 2006/0144711 A1* | 7/2006 | Kobata et al. | 205/82 |
| 2006/0256865 A1* | 11/2006 | Westerman | 375/240.12 |
| 2007/0176938 A1 | 8/2007 | Nagori | |
| 2008/0019448 A1* | 1/2008 | Lee et al. | 375/240.16 |
| 2008/0144711 A1* | 6/2008 | Chui et al. | 375/240.01 |
| 2008/0292287 A1* | 11/2008 | Oshima et al. | 386/126 |
| 2010/0086051 A1* | 4/2010 | Park et al. | 375/240.16 |
| 2011/0002389 A1* | 1/2011 | Xu et al. | 375/240.16 |
| 2011/0200111 A1* | 8/2011 | Chen et al. | 375/240.16 |
| 2012/0044996 A1* | 2/2012 | Sato | 375/240.16 |

* cited by examiner

*Primary Examiner* — James Pontius
(74) *Attorney, Agent, or Firm* — Robert D. Marshall, Jr.; Frank D. Cimino

(57) ABSTRACT

A video decoder receives data representing an encoded image frame partitioned into one or more partitions. The video decoder stores the motion vector associated with each partition. For partitions of size (k*S), k being an integer, and S being the smallest allowed size for a partition, the video decoder stores (k) separate entries of a same value as the value of the motion vector of the corresponding partition. When performing motion compensation to reconstruct the encoded macro-block, such a manner of storing enables the video decoder to retrieve pixel values of best-match partitions associated with each of the corresponding ones of the one or more partitions without having to process partition information specifying the type of the partitions.

16 Claims, 4 Drawing Sheets

PIXEL RETRIEVAL FOR FRAME RECONSTRUCTION

BACKGROUND

1. Technical Field

Embodiments of the present disclosure relate generally to video decoders, and more specifically to pixel retrieval for frame reconstruction in a video decoder.

2. Related Art

Frame reconstruction refers to operations performed to reconstruct compressed and encoded image frames in a video decoder. Image frames (also referred to as image frames) may be encoded using intra-frame, inter-frame or a combination of intra and inter-frame encoding techniques, such as for example, specified by the H.264 standard. The H.264 is described in further detail in ITU-T Recommendation H.264—"SERIES H: AUDIOVISUAL AND MULTIMEDIA SYSTEMS, Infrastructure of audiovisual services—Coding of moving video, Advanced video coding for generic audiovisual services", available from TELECOMMUNICATION STANDARDIZATION SECTOR of ITU. When inter-frame encoded frames (P-frames and B-frames) are to be reconstructed, an operation termed motion compensation is performed. The motion compensation operation involves determining, for a macro-block (or for portions termed partitions of a macro-block), a best-matching macro-block (or partition) in a previous or future frame (referred to as a reference frame).

Pixel values representing macro-blocks (or portions thereof) in an image frame are often stored in an external memory. External memory as referred to herein generally refers to memory that is physically located outside of a circuit portion performing the motion compensation. For example, when a circuit portion performing the motion compensation operation is contained in an integrated circuit (IC), an off-chip memory component may be referred to as an external memory. To perform motion compensation, pixel values of the best-matching macro-block (or partition) in a reference frame may need to be fetched from such external memory and stored for processing in an on-chip or internal memory. The time spent in performing such external memory fetches may need to be minimized or at least predictable in many operating environments. In general, pixel retrieval operations from an external memory to an internal memory of a video decoder may need to be made efficient.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A video decoder receives data representing an encoded image frame partitioned into one or more partitions. Each partition in the one or more partitions is associated with a motion vector, the maximum number of partitions allowed in the encoded macro block being N, the size of a smallest possible partition being S, and wherein a size of each partition is always an integer multiple of S. The video decoder stores the motion vector associated with each partition. For a partition of size (k*S), k being an integer, the video decoder stores k separate entries of a same value as the value of the motion vector of the partition. When performing motion compensation to reconstruct the encoded macro-block, such a manner of storing enables the video decoder to retrieve pixel values of best-match partitions associated with each of the corresponding ones of the one or more partitions without having to process the partition information specifying the type of the partitions.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with examples for illustration.

1. Example Device

Figure 1:
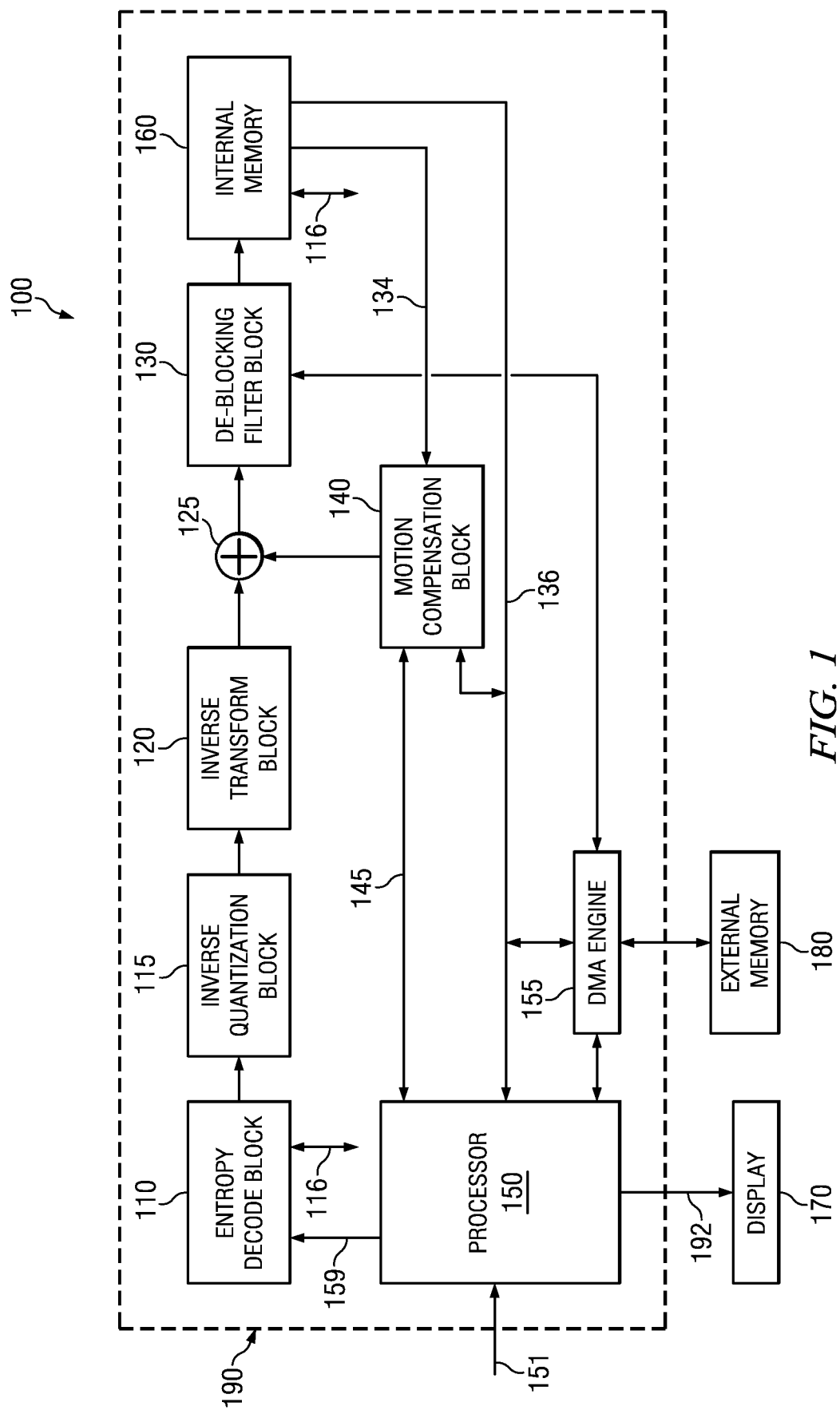
FIG. 1 is a block diagram illustrating the details of an example device in which several embodiments can be implemented.

FIG. 1 is a block diagram illustrating an example device or system in which several embodiments of the present disclosure can be implemented. Decoder 100 is shown containing entropy decode block 110, inverse quantization block 115, inverse transform block 120, summing block 125, de-blocking filter 130, internal memory 160, motion compensation block 140, processor 150, direct memory access (DMA) engine 155, display 170 and external memory 180. Only some of the details of decoder 100 as pertinent to an understanding of this disclosure are shown in FIG. 1 for conciseness. For further details of the H.264 standard, the reader is referred to the document noted in the background section. Further, though shown as separate blocks with distinct functionalities merely for illustration, the various blocks of FIG. 1 may be implemented using more or fewer blocks, possibly with some of the functionalities merged or split into one or multiple blocks (particularly when implemented as software modules).

In an embodiment, all blocks of FIG. 1, except display 170 and external memory 180 are implemented in integrated circuit (IC) form as IC 190 or as system-on-chip (SoC) 190.

Processor 150 receives compressed and encoded video streams on path 151, and parses the received video data stream in accordance with the H.264 standard. Parsing may include identification of the start of each transmitted unit (termed a Network Abstract Layer unit or NAL unit in H.264) by locating the start code of each NAL unit.

Processor 150 may determine the portions of the received bit stream which represent image data (typically in the form of encoded and compressed macro-blocks), as against various other parameters such as headers and NAL units not containing video data. Processor 150 forwards portions containing the encoded macro-blocks to entropy decode block 110 on path 159. Processor 150 executes instructions stored in internal memory 160. The instructions may be fetched by DMA engine 155 (under control of processor 150) from external memory 180 and stored in internal memory 160.

Entropy decode block 110, inverse quantization block 115, inverse transform block 120 perform operations which are the inverse of entropy coding, quantization and transform blocks in the corresponding transmitter (containing an H.264 encoder). Entropy decode block 110 receives the coded macro-blocks on path 159, and operates to perform entropy decoding on the entropy coded macro-blocks. Entropy decode block 110 forwards the entropy-decoded data stream to inverse quantization block 115. Inverse quantization block 115 re-scales the quantized coefficients received from entropy decode block 110, for example, by multiplying each of the coefficients by an integer value to restore each of the coefficients to the original scale level. Inverse quantization block 115 forwards the coefficients to inverse transform block 120. Inverse transform block 120 performs an inverse transform (e.g., inverse discrete cosine transform—inverse DCT) of the re-scaled coefficients to re-create each set of residual data.

Motion compensation block 140 compensates for the displacement of the macro-block (or partitions) as indicated by the motion vector in the encoded bit stream received on path 151. Motion compensation block 140 operates on one or more reference frames as indicated by the reference-index, which is also encoded in the bit-stream, to provide a best-matching macro-block (or partitions) to summing block 125 based on the motion vector obtained in the encoded stream. The best-matching macro-block/partition is referred to as a predicted macro-block/partition. Summing block 125 adds the pixel values of the best-matching predicted macro-block/partition received from motion compensation block 140 to the corresponding decoded residuals received from inverse transform block 120, to reconstruct a received and encoded (as received on path 151) macro-block. Summing block 125 forwards reconstructed macro-blocks and/or partitions, thus formed, to de-blocking filter block 130.

De-blocking filter block 130 may perform filtering operations on the reconstructed macro-blocks (decoded video) to improve visual quality which might have been impaired due to the encoding process. In general, de-blocking filter block 130 operates to improve the appearance of decoded pictures. De-blocking filter block 130 forwards the filtered macro-blocks/partitions (and thus the corresponding reconstructed image frames) for storage in external memory 180 with the help of DMA Engine 155. Alternatively, or in addition, de-blocking filter block 130 may store portions of a reconstructed image frame (such as a macro-block) in internal memory 160 as well.

Internal memory 160 is typically implemented as a random access memory (RAM). However, in other embodiments, internal memory 160 may instead be implemented as other memory types such as flash memory. While only processor 150, DMA engine 155, de-blocking filter block 130, motion compensation block 140 and entropy decode block 110 (via path 116) are shown in FIG. 1 as being provided access to internal memory 160, inverse quantization block 115 and inverse transform block 120 may also be provided such access. Also, although communication paths are shown only between processor 150 and some of the other blocks of FIG. 1, communications paths may exist between processor 150 and the rest of the other blocks as well. Internal memory 160 may also store instructions (to be executed by processor 150), for temporary data storage (such as storage of reconstructed macro-blocks), storing temporary results of processing operations performed by processor 150 and the other blocks of IC 190, etc.

DMA engine 155 provides direct memory access data transfers between a data source and a data sink, and may operate under control of processor 150. For example, motion compensation block 140 may request DMA engine 155 to transfer image frames (and thus macro-blocks or partitions in the image frames) from external memory 180 to internal memory 160 for use in motion compensation operations. Alternatively, motion compensation block 140 may request processor 150 to instruct DMA engine 155 to perform such transfer. Similarly, reconstructed macro-blocks may be transferred from internal memory 160 to external memory 180 also under DMA data transfer.

External memory 180 may store data and/or instructions (program) to be executed by processor 150, and represents a non-volatile storage medium. External memory, thus, represents a non-transient computer (or in general, machine) readable medium for storing instructions, which when executed by processor 150 enable several embodiments of the present disclosure. External memory 180 may be implemented as flash memory, erasable and programmable read-only memory (EPROM), etc. External memory 180 is also used to store reconstructed (decoded) image frames.

As noted above, the motion compensation operations performed by motion compensation block 140 often requires reconstructed macro-blocks (or image frames in general) to be fetched from external memory 180 to internal memory 160. In general, accesses by motion compensation block 140 (as well as by other blocks of IC 190) to internal memory 160 are faster than accesses to off-chip external memory 180. Hence, reconstructed macro-blocks are transferred from external memory 180 to internal memory 160 to enable faster processing, at least during motion compensation operations.

Figure 2:
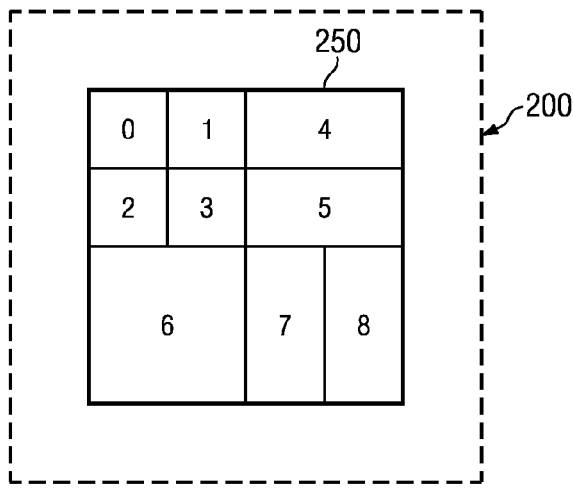
FIG. 2 is a diagram of an example (encoded) macro-block contained in an image frame.

In a video encoder, macro-blocks are often further logically divided into sub-macro-blocks, also termed partitions, as also noted above. Each partition of a macro-block may be encoded separately, and have (i.e., be associated with) its own motion vector computed during the encoding operation. Further, the sizes of the partitions may not all be the same. FIG. 2 shows an example macro-block 250, assumed to be of size 16×16 pixels, in image frame 200. Blocks 0, 1, 2, 3, 4, 5, 6, 7 and 8 represent partitions of macro-block 250. Partitions 0, 1, 2 and 3 are each of size 4×4 pixels, partitions 4 and 5 are each of size 8×4 pixels, partition 6 is of size 8×8 pixels, and partitions 7 and 8 are each of size 4×8 pixels. The sizes allowed for a partition may be specified by a corresponding standard, such as the H.264/AVC standard.

Figure 3:
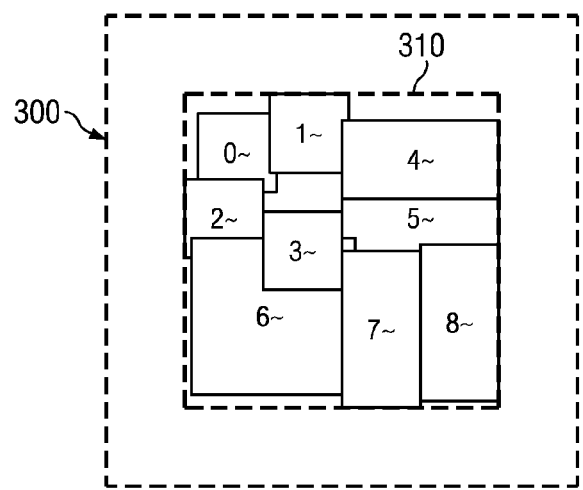
FIG. 3 is a diagram showing best-match partitions in a reference image frame used in motion compensation.

FIG. 3 is a diagram showing example displacements of the partitions (or alternatively, the best estimates of the positions of the partitions of macro-block 250 of FIG. 2) in reference image frame 300, which is generated earlier than image frame 200. Reference frame 300 is reconstructed and stored as a reconstructed image frame by video decoder prior to receipt (or at least processing) of image frame 200. In an embodiment, video decoder stores reconstructed image frames (including frames that are to be used as reference frames) in external memory 180.

When encoding macro-block 250, a video encoder computes a motion vector representing the best-estimate displacement of the partitions of macro-block 250, and transmits the motion vectors as well as the corresponding residuals representing the differences between the partition in macro-block 250 and the best-estimate displacement partition in frame 300 of FIG. 3. As noted above, frame 300 serves as a reference frame for inter-frame prediction of frame 200. Blocks 0~, 1~, 2~, 3~, 4~, 5~, 6~, 7~ and 8~ represent the best-matching blocks corresponding respectively to blocks (or partitions) 0, 1, 2, 3, 4, 5, 6, 7 and 8 of macro-block 250. The transmitted motion vectors and residuals represent macro-block 250 in encoded form.

To perform motion compensation for reconstruction of macro-block 250, video decoder 100 typically needs to retrieve pixel values of partitions 0~ through 8~ of reference frame 300 from external memory 180, and store the pixel values in internal memory 160. Such transfer to internal memory may be required to support more efficient or faster processing during motion compensation, as also noted above. To retrieve the pixel values of partitions 0~ through 8~, video decoder 100 may first obtain the motion vectors of each of the corresponding partitions 0 through 8 (of macro-block 250) from the input bit stream received on path 151. Prior to obtaining such motion vectors, video decoder 100 may need to decode partition information (in the bit stream received on path 151) specifying the 'type' of the partitions in a macro-block, such as macro-block 250. Video decoder 100 typically does not have a priori information of the 'type' of partitions into which a macro-block (e.g., 250) is divided into.

Partition information is typically represented in the form of macro-block type (mb_type) and sub-macro-block type (sub_mb_type). Macro-block type (mb_type) information specifies the nature of the macro-block, such as for example, whether the macro-block is an intra-coded macro-block or an inter-coded macro-block. Corresponding numbers for the macro-block type may be used to convey such information. In addition, mb_type also specifies the size (such as 16×16, 16×8, 8×16 and 8×8 pixels) and location of the partitions. Sub-macro-block type (sub_mb_type) information specifies the size and location of 8×8, 8×4, 4×8 and 4×4 partitions within an 8×8 block. Hence, with respect to the partitions of macro-block 250 of FIG. 2, video decoder 100 needs to obtain such partition information from the received bit stream (path 151) representing encoded image frame 200, so that video decoder 100 may obtain motion vectors corresponding to each of partitions 0 through 8 (of FIG. 2), and retrieve the pixel values of the corresponding best-match partitions 0~ through 8~ of frame 300 of FIG. 3.

Since the number of partitions that a macro-block is divided into may be variable, the number of units of time required to 'decode' the partition information is also variable. Consequently, the amount of time that may be needed to transfer the pixel values of the corresponding 'best-match' (0~ through 8~) partitions from external memory 180 to internal memory 160 may also be variable. Assuming, processor 150 is to perform the task of obtaining the partition information of macro-block 250, and then retrieve the corresponding best-match partitions from stored reference frame 300 of FIG. 3, the number of processor clock cycles spent in such task is, in general, variable and difficult to determine a priori. As a result, the design of the various tasks in reconstructing (decoding) an image frame (such as frame 200) in video decoder 100 may be rendered complex.

One technique that is used to simplify transfer of the best-matching partitions from external memory 180 to internal memory 160 is to determine a smallest 'bounding box' (e.g., dotted box 310 in FIG. 3) that bounds all the best-matching partitions, and then to retrieve all pixel values in the area represented by the bounding box (typically in a single DMA transfer from external memory 180 to internal memory 160). Here again, the determination of the smallest 'bounding box' area may be complex, since the bounding box area is itself variable, as may be appreciated. When dedicated hardware is implemented to perform the tasks of obtaining the partition information, determining the bounding box and then retrieving the matching partitions, the power consumption and area requirements of such hardware typically may be unacceptably high.

2. Storing Motion Vectors of Partitions

Figure 4:
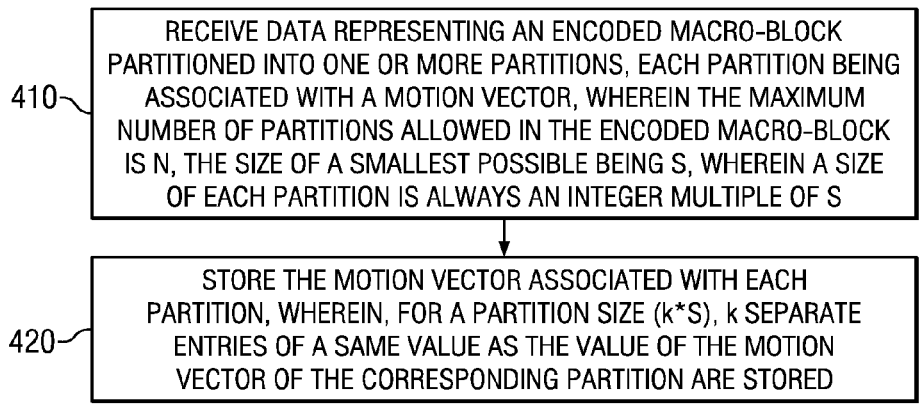
FIG. 4 is a flow diagram illustrating the manner in which motion vectors of partitions of an encoded macro-block are stored, in an embodiment.

FIG. 4 is a flow diagram illustrating the manner in which motion vectors of partitions of an encoded macro-block are stored. As described in sections below, such storing as described in the steps of the flow diagram, enables efficient transfer of pixel values of partitions of a reference frame used in motion compensation for reconstructing an encoded macro-block. The flow diagram is described with respect to video decoder 100 of FIG. 1, and specifically in relation to one or more of the blocks in video decoder 100, merely for illustration. However, various features described herein can be implemented in other devices and/or environments and using other components, as will be apparent to one skilled in the relevant arts by reading the disclosure provided herein. Further, the steps in the flow diagrams are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein.

In step 410, video decoder 100 receives data representing an encoded macro-block. The macro-block may be partitioned into one or more partitions, with each partition being associated with a motion vector. The maximum number of partitions allowed in the encoded macro-block is N and the size of a smallest possible (or allowed) partition is S. The size of any partition is always an integer multiple of S.

In an embodiment, the smallest size S allowed for a partition is 4×4 pixels. The size of a macro-block is 16×16 pixels, and other sizes allowed for the partitions are 4×8, 8×4, 8×8, 8×16, 16×8 and 16×16. It may be noted that the size of any of the partitions is an integer multiple of the smallest size 4×4. For example, a partition of size 4×8 is two times the size of a 4×4 block. With respect to FIG. 1, processor 150 may perform the operations of step 410. Control then passes to step 420.

In step 420, video decoder 100 stores the motion vector associated with each partition. For a partition of size (k*S), k being an integer, video decoder 100 stores 'k' separate entries of a same value as the value of the motion vector of the corresponding partition. To illustrate, a partition of size 4×8 is twice the size of a 4×4 partition. Assuming 4×4 is the smallest size S, then the size of the 4×8 partition is (2*S), k being equal to 2. Video decoder 100 receives the motion vector of the 4×8 partition, and stores the motion vector twice (i.e., as two separate entries), one for each of the 4×4 sub-portion of the 4×8 partition. Processor 150 may perform the operation of step 420 in conjunction with DMA engine 155.

Figure 5:
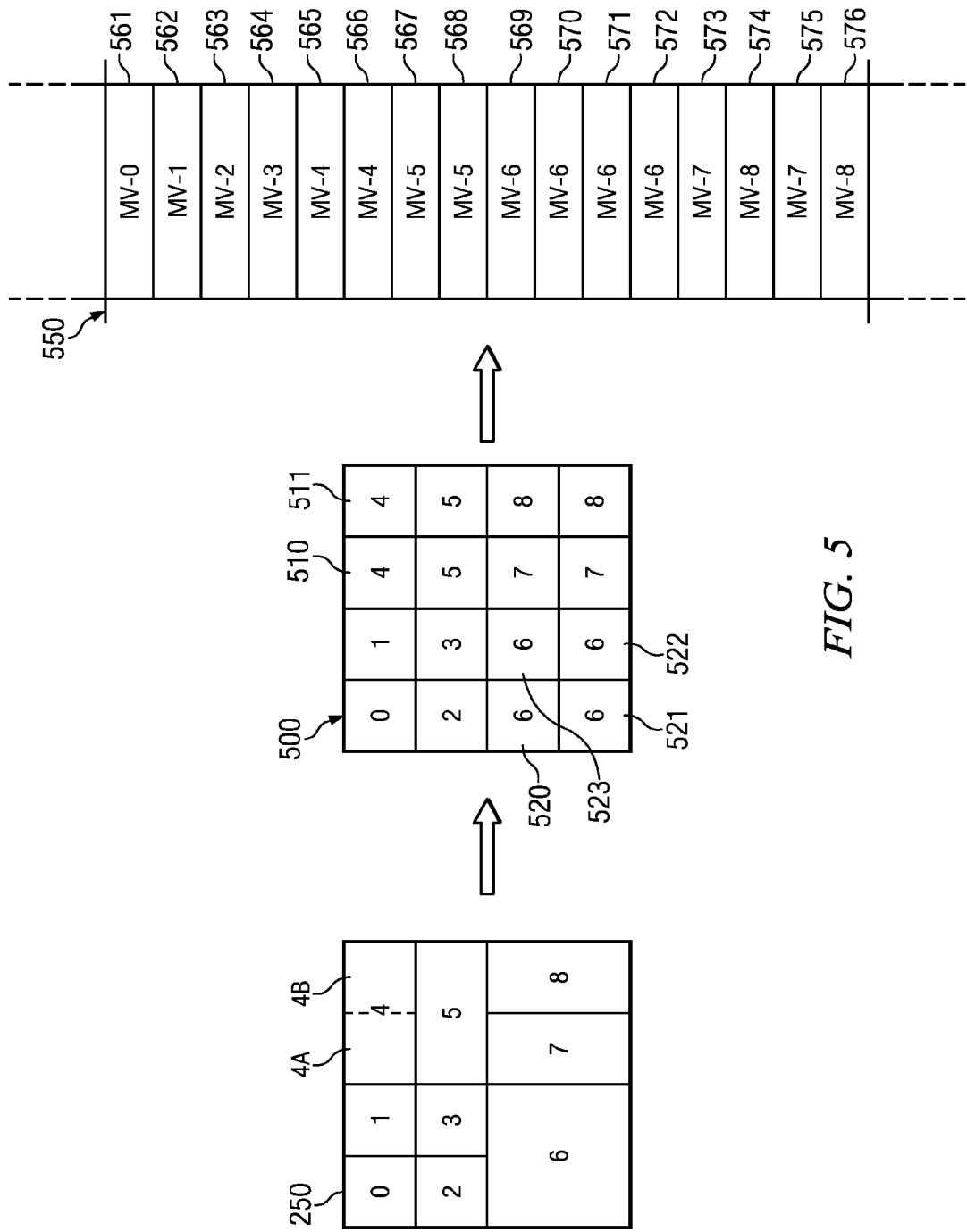
FIG. 5 is a diagram used to illustrate the manner in which motion vectors of partitions of an encoded macro-block are stored, in an embodiment.

FIG. 5 is a diagram used to illustrate the operations of the flow diagram of FIG. 4. Macro-block 250 of FIG. 2 is shown again in FIG. 5. Macro-block 250 is assumed to be of size 16×16 pixels, with partitions 0, 1, 2, 3, 4, 5, 6, 7 and 8 being of sizes 4×4 pixels, 4×4 pixels, 4×4 pixels, 4×4 pixels, 8×4 pixels, 8×4 pixels, 8×8 pixels, 4×8 pixels and 4×8 pixels respectively. Processor 150 (or alternatively entropy decode block 110) obtains the motion vectors of partitions 0 through 8 of macro-block 250, and stores the respective motion vectors in external memory 180. The motion vectors of partitions 0 through 8 respectively provide the displacement of the respective partitions 1 through 8 with respect to the respective ones of 'best-match' partitions 0~ through 8~ in reference frame 300 of FIG. 3.

For partitions of size greater than 4×4 pixels (4×4 pixel-size being assumed to be the smallest allowed size for a partition in a macro-block), processor 150 stores the motion vector of such partitions as many times as the factor by which the partition is larger in size than the smallest allowed partition of 4×4 pixels. To illustrate, partition 4 of macro-block 250 has a size 8×4 and is twice as large (k=2) as the smallest size of 4×4 pixels. Hence, processor 150 writes the motion vector of partition 4 twice, once for each of the two 4×4 portions (4A and 4B) of partition 4. This is represented in grid 500 by the entries '4' in each of boxes 510 and 511. The motion vector entries corresponding to partition 5 is similarly duplicated, as indicated by the two entries '5'.

Partition 6 of macro-block 250 has a size 8×8 and is four times as large (k=4) as the smallest size of 4×4 pixels. Hence, processor 150 writes the motion vector of partition 6 four times, once for each of the four 4×4 portions of partition 4. This is represented in grid 500 by the entries '6' in each of boxes 520, 521, 522 and 523. Entries corresponding to partitions 7 and 8 are also shown in grid 500. Partitions 0, 1, 2, and 3 being of the smallest size of 4×4 pixels, only one entry of the corresponding motion vector is made, as also shown in grid 500. In an embodiment, the operations of the flow diagram of FIG. 4 are performed by entropy decode block 110 instead of processor 150.

Array 550 shows the actual motion vector entries made by processor 150 in external memory 180. It may be observed that the entries in array 550 correspond to those in grid 500 (grid 500 being a representation of array 550 and used for illustration and clarification only), and as described above. Each of memory locations 561 through 576 of array 550 stores a motion vector associated with a corresponding 4×4 (smallest sized) portion. Although, in an embodiment, processor 150 stores the entries in external memory 180, in other embodiments, processor 150 may store the motion vector entries of array 550 in internal memory 160. Although, the motion vectors are shown as being stored in an array, in general, any data structure can be used.

Irrespective of where the motion vectors are stored, the manner of storing entries corresponding to each of the smallest allowed partition (4×4 in the example of above) enables video decoder 100 to retrieve pixel values of the corresponding best-match portions from a reference frame (from frame 300) without having to process and interpret the partition information of the partitions 0 through 8 of macro-block 250.

Since motion vector entries are made corresponding to each of the smallest-allowed size for a partition, it may be appreciated that for a macro-block of a particular size (16×16 in the above example), the number of entries in array 550 is always equal to the largest number (N) of partitions that a macro-block can be partitioned into (16 in the example). Hence, the number of entries is fixed in array 550. As a result, video decoder 100 does not need to process the partition information (specifying mb_type and sub_mb_type, as noted above) pertaining to macro-block 250. Instead, video decoder 100 'knows' that motion vectors of all partitions (split into smallest allowed size, if necessary) is available in array 550, and can thus simply retrieve the motion vectors, and therefore the corresponding best-match partitions in reference frame 300, without having to determine the partition sizes, i.e., without having to process the partition information.

Thus, processor 150 may retrieve the motion vectors shown in array 550 and instruct DMA engine 155 to transfer the corresponding pixel values from external memory 180 to internal memory 160. Thus, pixel values represented by best-match partitions 0~, 1~, 2~, 3~, 4~, 5~, 6~, 7~ and 8~ may be transferred from external memory 180 to internal memory 160, and may be done so in a fixed and therefore 'deterministic' time, irrespective of the actual number and/or size of partitions in an encoded macro-block.

In an embodiment, instead of retrieving pixels values one best-match-partition at a time, processor 150 computes a bounding box that bounds all the N partitions for which motion vectors are stored in array 550. Then, process 150 may instruct DMA engine 155 to transfer all the pixel values within the bounding box to internal memory 160 in a single DMA transfer.

In another embodiment, a dedicated hardware accelerator is implemented to perform the tasks of determining the bounding box and then retrieving the matching partitions. Due to the simplification achieved by storing motion vectors for all N smallest possible partitions (irrespective of the sizes of the actual partitions of an encoded macro-block), the design of the hardware accelerator is rendered less complex, and can be implemented using a fewer number of gates (less logic blocks, in general). The power consumption and area requirements of such a hardware accelerator are thereby minimized.

The operations described above apply when all partitions of a macro-block are predicted using a same reference frame. A P-type picture specified in the H.264 standard is an example of a picture (frame or field) whose macro-block partitions are all predicted using a same (single) reference frame. When macro-block prediction is performed based on multiple references frame, the above technique is slightly modified as described next.

3. Partitions Predicted Using Multiple Reference Frames

An example of a picture type whose macro-block partitions may be predicted using multiple reference frames is a B-type picture specified by the H.264 standard. Thus, assuming frame 200 is a B-type frame, one or more partitions of block 250 may be encoded using corresponding partitions not just in reference frame 300, but from multiple reference frames (not shown). Further, partitions of a same macro-block may be predicted differently, some using only one reference frame, and others using multiple reference frames.

Specifically, for a P-type frame, the H.264 standard specifies that the maximum number of reference frames that may be used equals four, with all partitions less than or equal to 8×8 pixels being predicted using a maximum of only one reference frame.

For B-type frames, two sets (or lists) of frames may be used, with one set (generally referred to as L0) containing past frames, and the other set (generally referred to as L1) containing future (in terms of generation order) frames. The H.264 standard specifies that only a maximum of four reference frames from each set should be used to predict a macro-block. Thus, a bi-predicted (B) type 8×8 partition will be predicted by one frame from L0 and one frame from L1.

Figure 6:
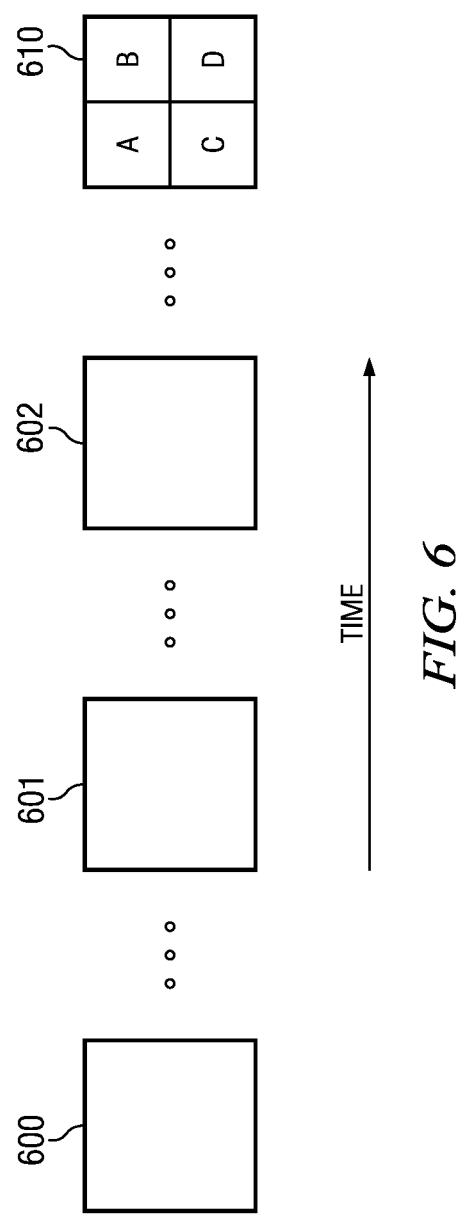
FIG. 6 is a diagram showing a sequence of image frames in decoding order.

FIG. 6 shows a macro-block 610, with four example blocks A, B, C and D, each of size 8×8 pixels. Assuming macro-block 610 is contained in a P-type frame, up to (i.e., a total of) four earlier reference frames may be used to encode the partitions in blocks A, B, C and D in macro-block 610. However, for encoding partitions in any of blocks A, B, C and D, only one reference frame may be used. Thus, partitions in block A may each be predicted using (an earlier) reference frame 600, partitions in block B may be predicted using (an earlier) reference frame 601, partitions in block C may be predicted using (an earlier) reference frame 602, and so on. The specific reference frame that is used for prediction of partitions of any 8×8 block is specified in the form of a reference number received on path 151 by video decoder 100 along with data representing an encoded macro-block.

In such cases, a bounding box is determined separately for each 8×8 block, rather than determining a single bounding box for the complete macro-block (which would not be possible due to the use of multiple reference frames for prediction). The bounding box for each 8×8 block may be determined in a manner similar to that described above for macro-block 250. In determining a bounding box for an 8×8 block, the technique of the flow diagram of FIG. 4 is used to enable video decoder 100 to transfer pixel values of best-match partitions without having to process the corresponding partition information. Thus, multiple bounding boxes may need to be determined separately for each of the four 8×8 blocks A, B, C and D, assuming a different reference frame is used to encode partitions in each of blocks A, B, C and D.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A method of processing an encoded image frame, the method being performed in a video decoder, the method comprising:
 receiving data representing an encoded macro-block in the encoded image frame, wherein the encoded macro-block is partitioned into one or more partitions, wherein each partition in the one or more partitions is associated with a motion vector, wherein the maximum number of partitions allowed in the encoded macro block is N, the size of a smallest possible partition being S, wherein a size of each partition in the plurality of partitions is always an integer multiple of S, wherein at least one partition in the plurality of partitions has a size greater than the smallest possible partition size S;
 storing the motion vector associated with the one or more partitions of a macro block in a fixed format of N entries independent of a number of the one or more partitions of the macroblock, each of the N entries including the motion vector associated with a corresponding smallest possible partition S of the macro block; and
 wherein, for a partition in the one or more partitions of a macro block having a size (k*S), k being an integer, the storing step stores k separate entries of a same value as the value of the motion vector of the partition.

2. The method of claim 1, wherein the encoded macro-block is of size 16×16 pixels, wherein N equals 16 and S equals a 4×4 pixel-area.

3. The method of claim 1, wherein the data comprises identifiers specifying the type of the macro-block as well as a partition information specifying the types of each of the one or more partitions of the macro-block,
 wherein, when the video decoder is to perform motion compensation to reconstruct the encoded macro-block, the video decoder retrieves the N entries,
 whereby, the video decoder is enabled to retrieve pixel values of best-match partitions associated with each of the corresponding ones of the one or more partitions without having to process the partition information.

4. The method of claim 3, wherein the best-match partitions associated with each of the corresponding ones of the one or more partitions is stored in a memory external to the video decoder, wherein the video decoder determines the locations of the best-match partitions using the N entries,
 wherein the video decoder determines a bounding box encompassing a smallest area containing all of the one or more partitions in the same reference frame, and retrieves pixel values representing the smallest area in a single direct memory access (DMA) cycle from the memory.

5. The method of claim 3, wherein the video decoder is designed in accordance with H.264 specifications.

6. The method of claim 1, wherein a first portion of the encoded macro-block contains a first set of partitions, each of the partitions in the first set being predicted from a first reference frame, wherein a second portion of the encoded macro-block contains a second set of partitions, each of the partitions in the second set being predicted from a second reference frame,
 wherein, for each partition in the first set of partitions of size (k*S), the storing stores k separate entries of a same value as the value of the motion vector of the corresponding partition in the first set, and
 wherein, for each partition in the second set of partitions of size (k*S), the storing stores k separate entries of a same value as the value of the motion vector of the corresponding partition in the second set.

7. The method of claim 6, wherein the size of each of the first portion and the second portion is 8×8 pixels.

8. The method of claim 6, wherein the data comprises identifiers specifying the type of the macro-block as well as a partition information specifying the types of each partition in the first set and the second set,
 wherein, when the video decoder is to perform motion compensation to reconstruct the encoded macro-block, the video decoder retrieves each of the k separate entries corresponding to the first set and the second set,
 whereby, the video decoder is enabled to retrieve pixel values of corresponding best-match partitions associated with partitions in the first set and the second set without having to process the partition information.

9. A video decoder comprising:
 a processor to receive data representing an encoded macro-block in an encoded image frame, wherein the encoded macro-block is partitioned into one or more partitions, wherein each partition in the one or more partitions is associated with a motion vector, wherein the maximum number of partitions allowed in the encoded macro block is N, the size of a smallest possible partition being S, wherein a size of each partition in the plurality of partitions is always an integer multiple of S, wherein at least one partition in the plurality of partitions has a size greater than the smallest possible partition size S; and
 an external memory,
 wherein the processor is operable to store, in the external memory, the motion vector associated with the one or more partitions of a macro block in a fixed format of N entries independent of a number of the one or more partitions of the macroblock, each of the N entries including the motion vector associated with a corresponding smallest possible partition S of the macro block and wherein each of the motion vectors is comprised in the data, wherein, for a partition in the one or more partitions of a macro block having a size (k*S), k being an integer, the processor stores k separate entries of a same value as the value of the motion vector of the partition.

10. The video decoder of claim 9, wherein the encoded macro-block is of size 16×16 pixels, wherein N equals 16 and S equals a 4×4 pixel-area.

11. The video decoder of claim 9, wherein the data comprises identifiers specifying the type of the macro-block as well as a partition information specifying the types of each of the one or more partitions of the macro-block, the video decoder further comprising a motion compensation block,
wherein, when the motion compensation block is to perform motion compensation to reconstruct the encoded macro-block, the processor retrieves the N entries from the external memory,
whereby, the processor is enabled to retrieve, from the external memory, pixel values of best-match partitions associated with each of the corresponding ones of the one or more partitions without having to process the partition information.

12. The video decoder of claim 11, wherein the video decoder is designed to operate in accordance with H.264 specifications.

13. The video decoder of claim 11, wherein the best-match partitions associated with each of the corresponding ones of the one or more partitions is stored in the external memory, wherein the processor determines the locations of the best-match partitions using the N entries,
wherein the processor determines a bounding box encompassing a smallest area containing all of the one or more partitions in the same reference frame, and retrieves pixel values representing the smallest area in a single direct memory access (DMA) cycle from the external memory.

14. The video decoder of claim 9, wherein a first portion of the encoded macro-block contains a first set of partitions, each of the partitions in the first set being predicted from a first reference frame, wherein a second portion of the encoded macro-block contains a second set of partitions, each of the partitions in the second set being predicted from a second reference frame,
wherein, for each partition in the first set of partitions of size (k*S), the processor stores, in the external memory, k separate entries of a same value as the value of the motion vector of the corresponding partition in the first set, and
wherein, for each partition in the second set of partitions of size (k*S) also, the processor stores, in the external memory, k separate entries of a same value as the value of the motion vector of the corresponding partition in the second set.

15. The video decoder of claim 14, wherein the size of each of the first portion and the second portion is 8×8 pixels.

16. The video decoder of claim 14, wherein the data comprises identifiers specifying the type of the macro-block as well as a partition information specifying the types of each partition in the first set and the second set, the video decoder further comprising a motion compensation block,
wherein, when the motion compensation block is to perform motion compensation to reconstruct the encoded macro-block, the processor retrieves each of the k separate entries corresponding to the first set and the second set from the external memory,
whereby, the processor is enabled to retrieve pixel values of corresponding best-match partitions associated with partitions in the first set and the second set without having to process the partition information.

\* \* \* \* \*